United States Patent [19]

Grabbe

[11] Patent Number: 5,061,827

[45] Date of Patent: Oct. 29, 1991

[54] TERMINATION OF A SMALL COAXIAL CABLE

[75] Inventor: Dimitry G. Grabbe, Middletown, Pa.

[73] Assignee: AMP Incorporated, Harrisburg, Pa.

[21] Appl. No.: 544,300

[22] Filed: Jun. 27, 1990

[51] Int. Cl.[5] .............................................. H02G 15/02

[52] U.S. Cl. ...................................... 174/756; 29/866; 29/867; 219/121.64; 219/121.69; 219/85.1

[58] Field of Search ................... 174/75 C; 219/85 R, 219/85 M, 121.68, 121.69, 121.63, 121.64; 29/865, 866, 867

[56] References Cited

U.S. PATENT DOCUMENTS

| | | | |
|---|---|---|---|
| 2,175,251 | 10/1939 | Carson | 29/865 |
| 3,109,052 | 10/1963 | Dumire et al. | 174/75 C |
| 3,517,375 | 6/1970 | Mancini | 175/75 C |
| 3,546,365 | 11/1969 | Collier | 174/75 C X |
| 3,626,143 | 12/1971 | Fry | 219/121.69 |
| 3,828,298 | 8/1974 | Schumacher | 174/75 C X |
| 4,331,374 | 5/1982 | Phillips | 174/75 C X |
| 4,894,115 | 1/1990 | Eichelberger et al. | 219/121.69 X |
| 4,926,022 | 5/1990 | Freedman | 219/121.63 |

*Primary Examiner*—Morris H. Nimmo
*Attorney, Agent, or Firm*—James M. Trygg

[57] ABSTRACT

A small ferrule having inwardly projecting lances is clenched about a small coaxial cable. The tips of the lances pierce the outer plastic covering of the cable and mechanically engage the underlying metal shield layer. Each lance includes an opening adjacent thereto through which a laser beam is directed to disintegrate a portion of the plastic layer adjacent the lance. Solder paste is then deposited into the opening and heated to cause the solder to reflow and form a low-resistance contact between each lance and an adjacent portion of the shield.

10 Claims, 5 Drawing Sheets

TERMINATION OF A SMALL COAXIAL CABLE

The present invention is related to an electrical termination of an outer shield of a fine coaxial wire.

BACKGROUND OF THE INVENTION

In the medical industry, the use of very sophisticated electronic equipment is becoming commonplace. The instrumentation of this equipment, especially in the ultrasound area, is requiring large numbers of terminations of very small diameter interconnecting wires. For example, 1,000 conductor cables may have to be terminated to a crystal in an area measuring only $\frac{3}{8}\times\frac{3}{4}$ inches. In such a case up to 400 positions may have to be arranged within an area of about 0.062 square inches. An additional complexity, resulting from the need to minimize leakage of the low level signals carried by these conductors, the conductors are usually of the coaxial type. These coaxial cables may be as small as 0.008 inch in diameter. In practice, the transducer and equipment are interconnected by means of these cables.

In the process of diagnostic examination of a patient, a particular cable assembly is selected from a rack containing a number of cable assemblies each having a unique type of transducer attached to one end. The other end, which is terminated to a connector, is then plugged into the diagnostic equipment. During the normal course of an examination, as many as 20 different transducer-cables may be alternately used.

At the present state of the art in the industry, these fine coaxial cables are being terminated manually. The procedure is done under a microscope by a skilled technician who must strip the outer plastic cover from the cable, wipe the braid or helical shield back, and tin the shield and core wire, all being done prior to terminating the coaxial conductor to the transducer or connector. It takes about 12 hours of a technician's time to terminate a 128 conductor shielded cable in this manner. It is the purpose of the present invention to eliminate most of the manual labor involved in this work and to provide a method and apparatus for automation of these time consuming manual steps.

SUMMARY OF THE INVENTION

The present invention is a method and apparatus for terminating a fine coaxial cable to respective terminals in a transducer or connector. The termination of the shield of the coaxial cable includes a ferrule having a plurality of lances projecting inwardly from an inner surface of a wall of the ferrule. Each lance has a tip in mechanical contact with the shield. There is a first plurality of openings through the wall that are disposed so that at least one opening is adjacent each tip. An electrically conductive material is disposed in the openings in low-resistance contact with both the tips and respective portions of the shield adjacent the tip.

BRIEF DESCRIPTION OF THE PREFERRED EMBODIMENT

Figure 1:
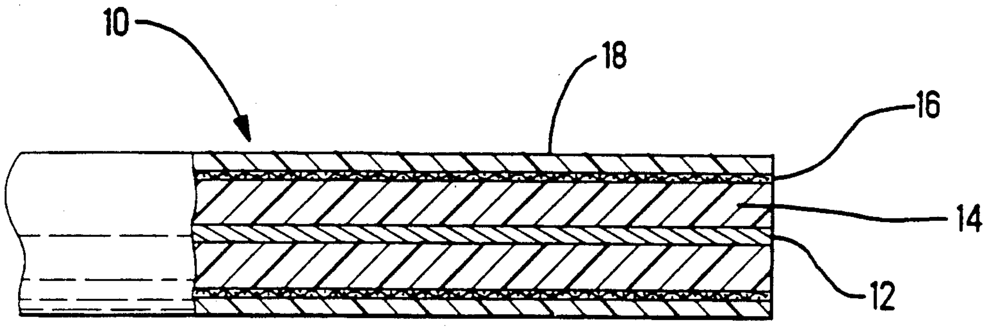
FIG. 1 shows a partial cross-sectional view of a fine coaxial cable.
Figure 2:
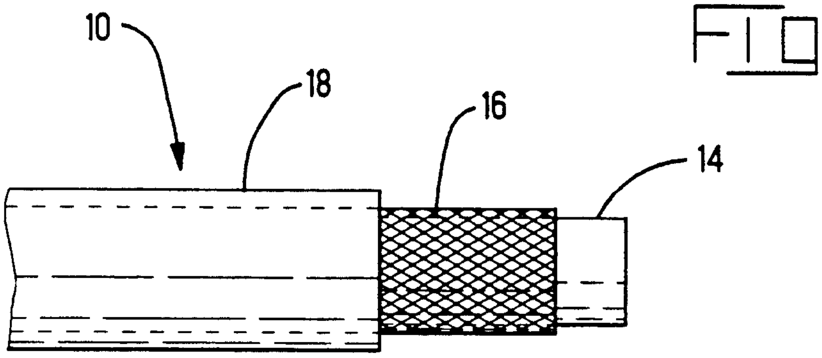
FIG. 2 PRIOR ART
FIG. 2 shows the cable of FIG. 1 with the outer covering stripped and the shield cut to length.
Figure 3:
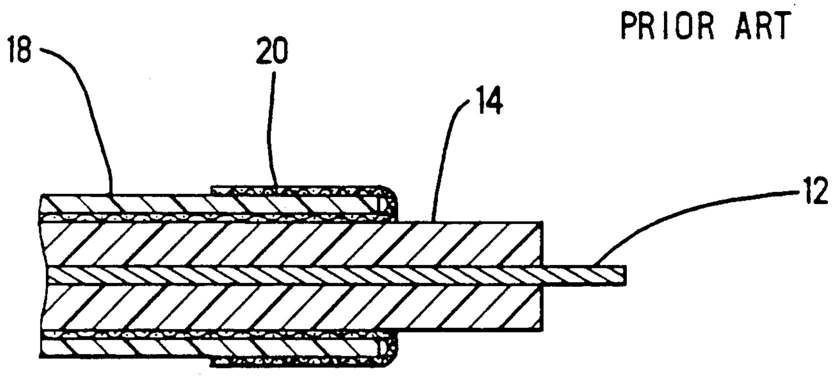
FIG. 3 PRIOR ART
FIG. 3 shows the cable of FIG. 2 as prepared by the methods of the prior art.

There is shown in FIG. 1 a coaxial cable 10 having an inner conductor 12, a dielectric layer 14, a shield 16, and an outer protective covering 18 that is a dielectric as well as abrasion resistant. The center conductor 12 may be a single strand as small as 0.002 inch in diameter or it may be multi-strand, as for example, 7 strands each being as small as 0.0005 inch. The layer 14 is usually a material having a low dielectric constant such as, for example, Teflon or foamed Teflon. The shield 16 may be constructed of thin metal braid or shallow helical wound thin metal wires having a diameter of about 0.0005 inch. The outer protective covering 18 has a thickness of about 0.001 inch. The tedious and time consuming task of terminating such fine cables will be appreciated by those skilled in the art. The procedures for doing this include stripping a portion of the outer covering 18 from the end exposing the shield 16, as best seen in FIG. 2. A portion of the shield 18 is stripped away to expose the end of the layer 14, as shown in FIG. 2, and that end is also stripped away to expose the end of the central conductor 12 as shown in FIG. 3. A portion 20 of the shield is then carefully folded back over the outer covering 18, as shown in FIG. 3, and tinned. The end of the conductor 12 is usually tinned at this time as well. Heretofore, all of these operations were done manually with tweezers under a microscope.

Figure 4:
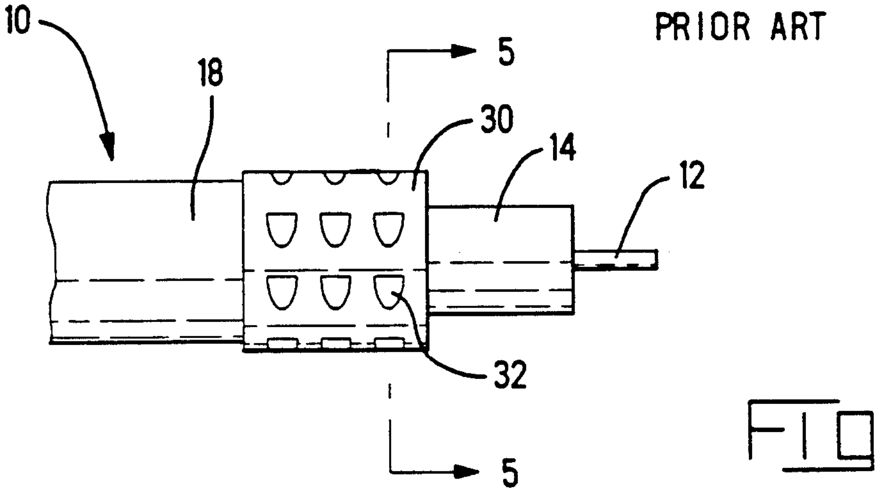
FIG. 4 shows the cable of FIG. 2 as prepared by the method and apparatus of the present invention.
Figure 5:
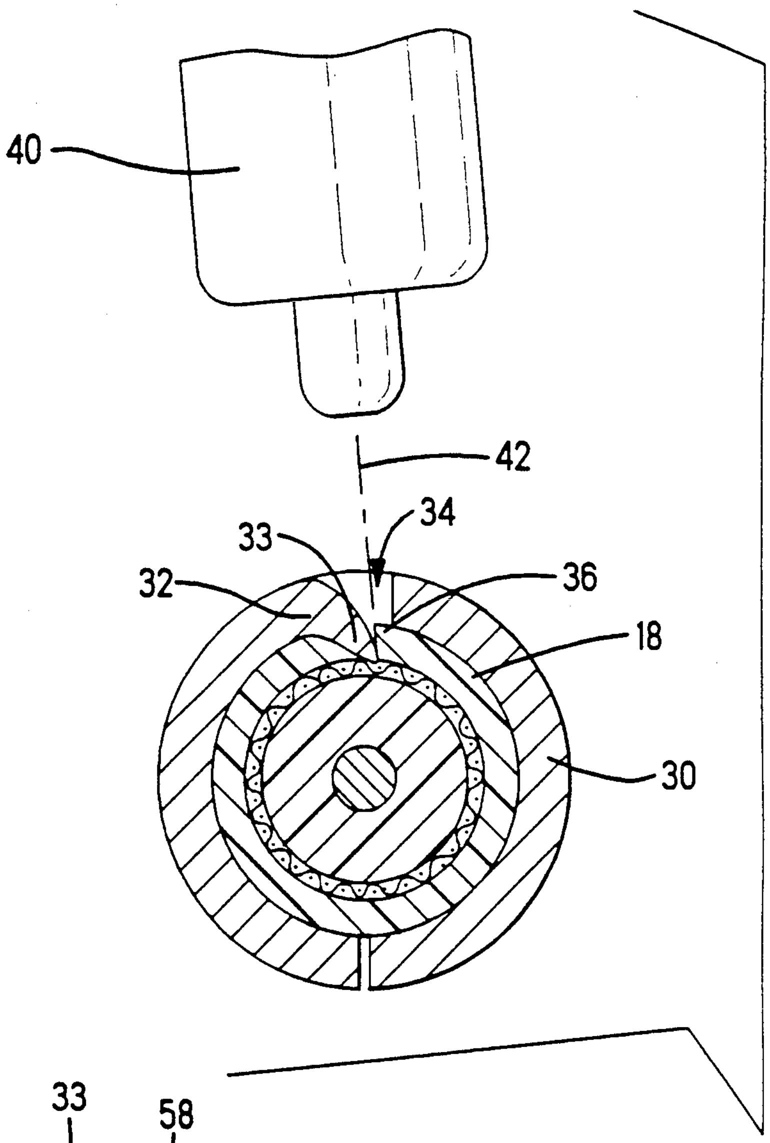
FIG. 5 is a cross-sectional view of the cable taken along the lines 5—5 in FIG. 4 prior to soldering.
Figure 6:
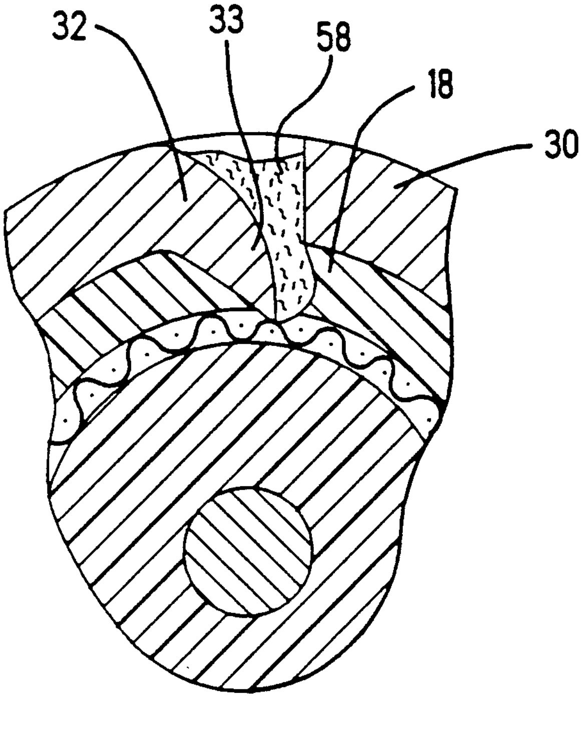
FIG. 6 is a view similar to that of FIG. 5 but after soldering.

The present invention provides a terminal structure for the shield 16, as illustrated in FIG. 4, which permits automation of the process of terminating the cable 10. A ferrule 30, made of a conductive metal and having a plurality of lances 32 formed therein, is clenched about the cable 10 so that tips 33 of the lances pierce the covering 18 and engage the underlying shield 16. As is shown in FIG. 5, there is a small opening 34 adjacent each lance 32 exposing a portion 36 of the covering 18 adjacent the lance 32. This portion 36 is removed by any suitable means, including mechanically cutting using a tool, chemical etching, sputtering, or vaporizing. In the present example, a laser 40 is used to vaporize the exposed plastic portion 36. A beam 42 of light is directed from the laser 40 into the opening 34 and focused on the portion 36. The intensity of the laser beam is sufficient to vaporize the plastic of the covering 18 that is exposed in the opening 34, but not sufficiently intense to damage the fine wires of the shield 16. By way of example, a $CO_2$ gas discharge laser would be suitable for this purpose. The reason for removing the plastic is to expose the shield adjacent the tip 33 so that a good electrical connection can be made between the lance and the shield. This connection is accomplished by reflowing solder, or similar conductive material into the opening 34 to form a low-resistance electrical connection, as shown in FIG. 6.

Figure 7:
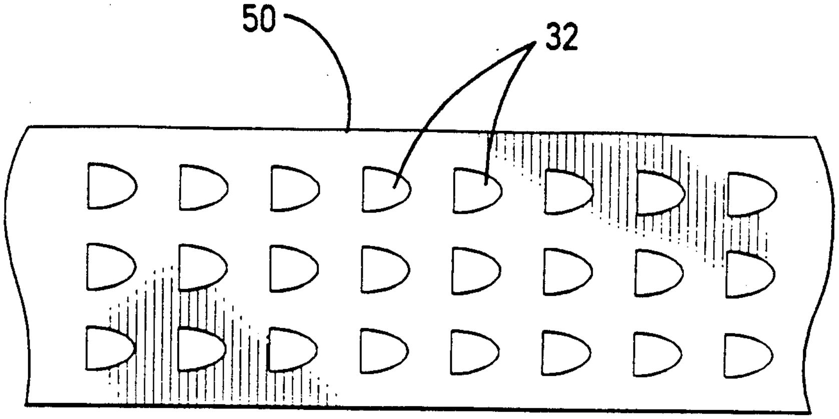
FIG. 7 is a plan view of a copper sheet showing a typical distribution of lances.
Figure 8:
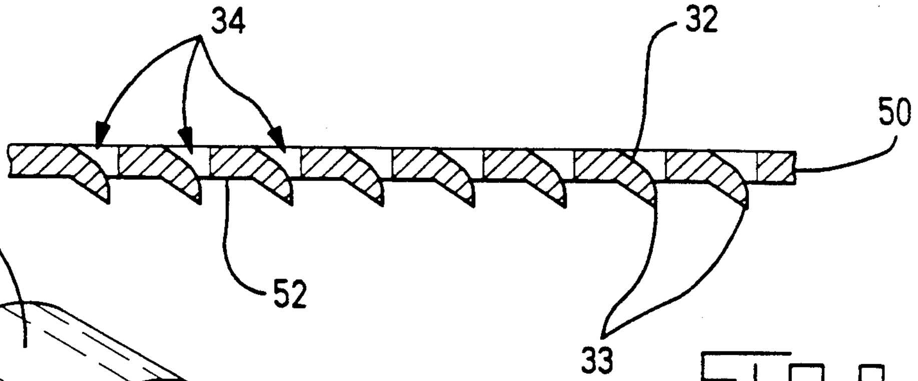
FIG. 8 is a front view of the view of FIG. 7.
Figure 8A:
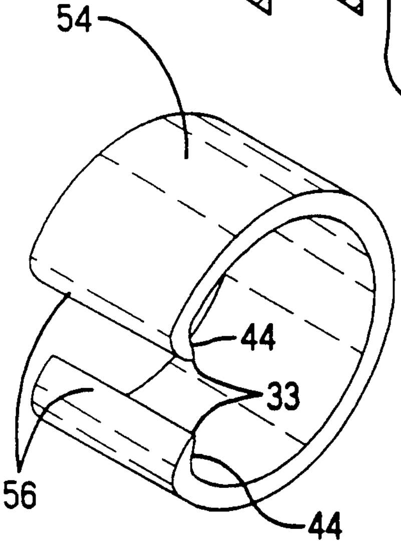
FIG. 8A is an isometric view of a second embodiment of the ferrule shown in FIG. 4.

The ferrules 30 are made from copper or copper alloy sheet 50 having, in the present example, a thickness of about 0.002 inch and a width of about 0.125 inch. The sheet 50 may be maintained on a large supply roll and fed into a set of roll dies, not shown, for continuously forming the lances 32, three abreast as shown in FIG. 7. As can be seen in FIG. 8 the tips 33 are very sharp so that they can penetrate the plastic covering 18 during the clenching operation. The tips 33 project from the surface 52 approximately 0.001 to 0.0015 inch. Dies suitable for forming the lances 32 are well known in the industry and therefore will not be further described here. At this point the formed sheet 50 may be wound onto a storage reel for future use, or it may be fed into a machine where a measured length is severed from the sheet and rolled into a ferrule 30 and clenched onto the cable 10. An alternative to the lances 32 of the portion 54, shown in FIG. 8A, is that the cut ends 56 have turned down edges 44 having sharp tips 33. The tips 33 are very sharp so that they will penetrate the protective covering 18 and engage the shield 16 during the clenching operation.

Figure 9:
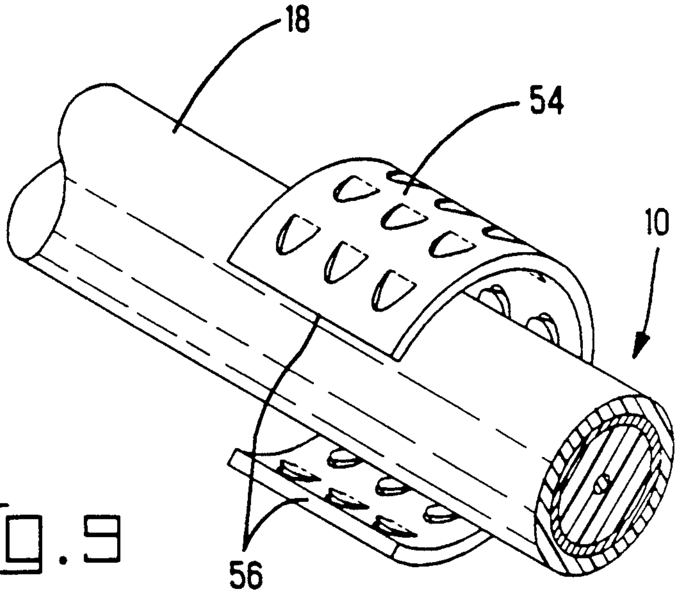
FIGS. 9, 10, and 11 illustrate the steps of installing the ferrule to the shield of the cable.
Figure 10:
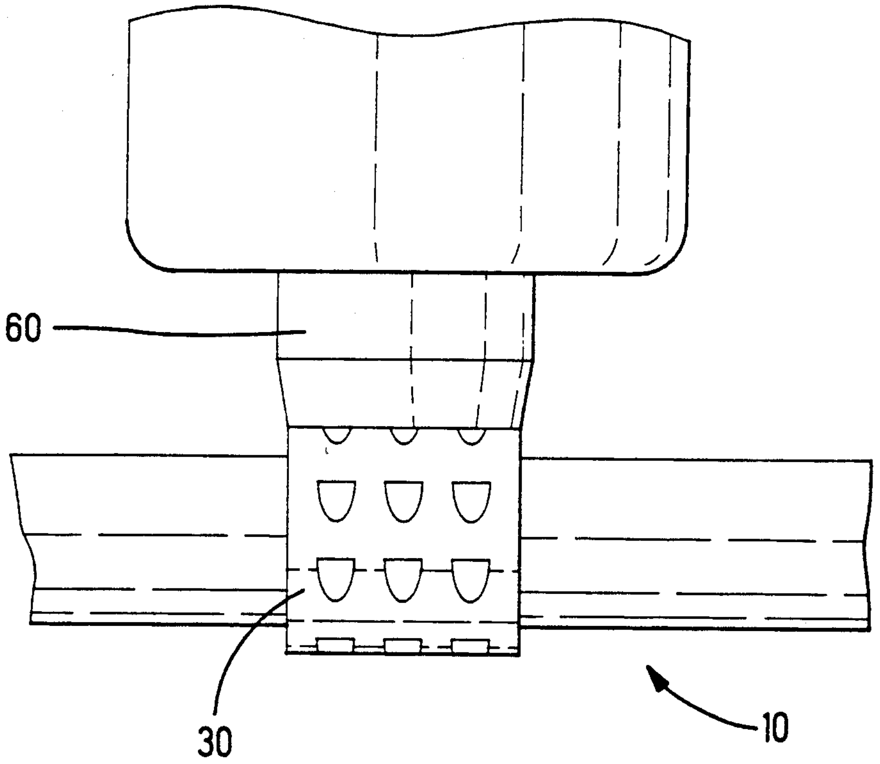
Figure 11:
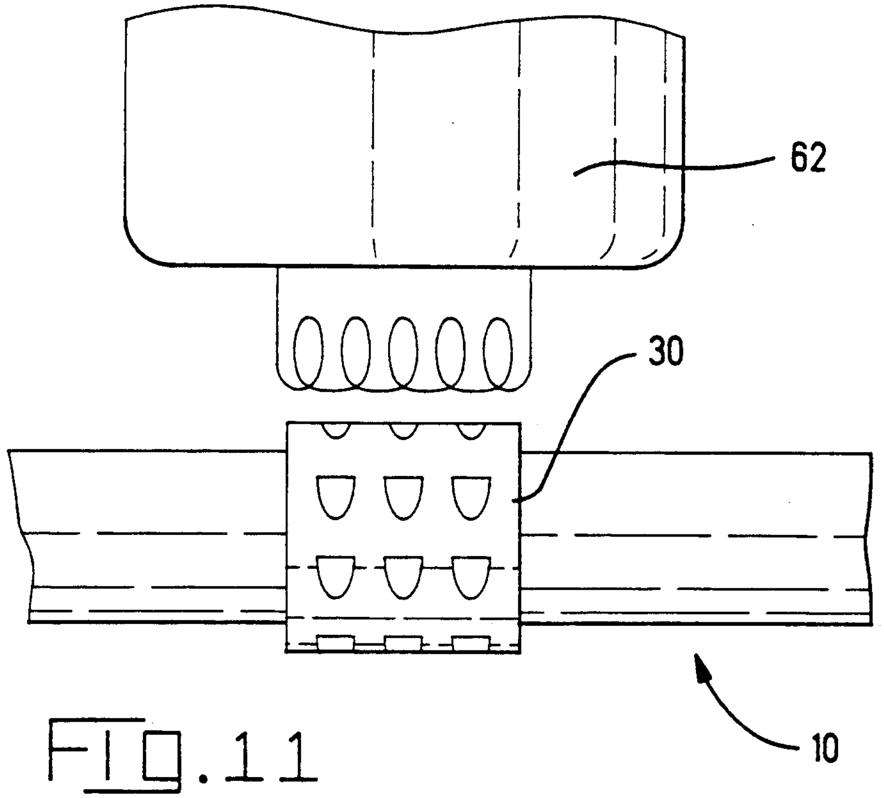

FIG. 9 schematically shows this clenching operation where the cut portion 54 of the sheet 50 is formed into a cylindrical shape about the cable 10. As the cut ends 56 are brought together, the tips 33 are forced into and through the outer covering 18 and into mechanical engagement with the metal shield 16. This is accomplished by any suitable clenching die in a manner that is well known in the industry. The cable 10 and clenched ferrule 30 are then exposed to the laser 40 in the manner set forth above and depicted in FIG. 5 to vaporize the plastic portions 36. Solder 58, or another suitable reflowable conductive material is then deposited in the openings 34 which may be accomplished, for example, by injecting solder paste into the openings under pressure by means of an extrusion head 60, as shown in FIG. 10. The cable and attached ferrule 30 are then positioned adjacent a heater 62 that directs sufficient heat to the ferrule to reflow the solder 58 within the openings 34 so that the solder joins the lances 32 with respective portions of the shield 16 in low resistance electrical connections. The heater 62 may be an electrical resistance heater, an electron beam gun, an RF generator, or any other suitable device that provides sufficient heat to the ferrule, solder, and shield. In the case of the portion 54 having the turned down edges 44, the cut ends 56, after clenching, form an opening therebetween which exposes a portion of the plastic protective covering 18 adjacent the edges 44. This opening is analogous to the openings 34. The plastic exposed between the ends 56 is removed as described above with respect to the openings 34, and solder deposited therein and reflowed to form a low resistance electrical contact between the shield 16 and the edges 44.

Figure 12:
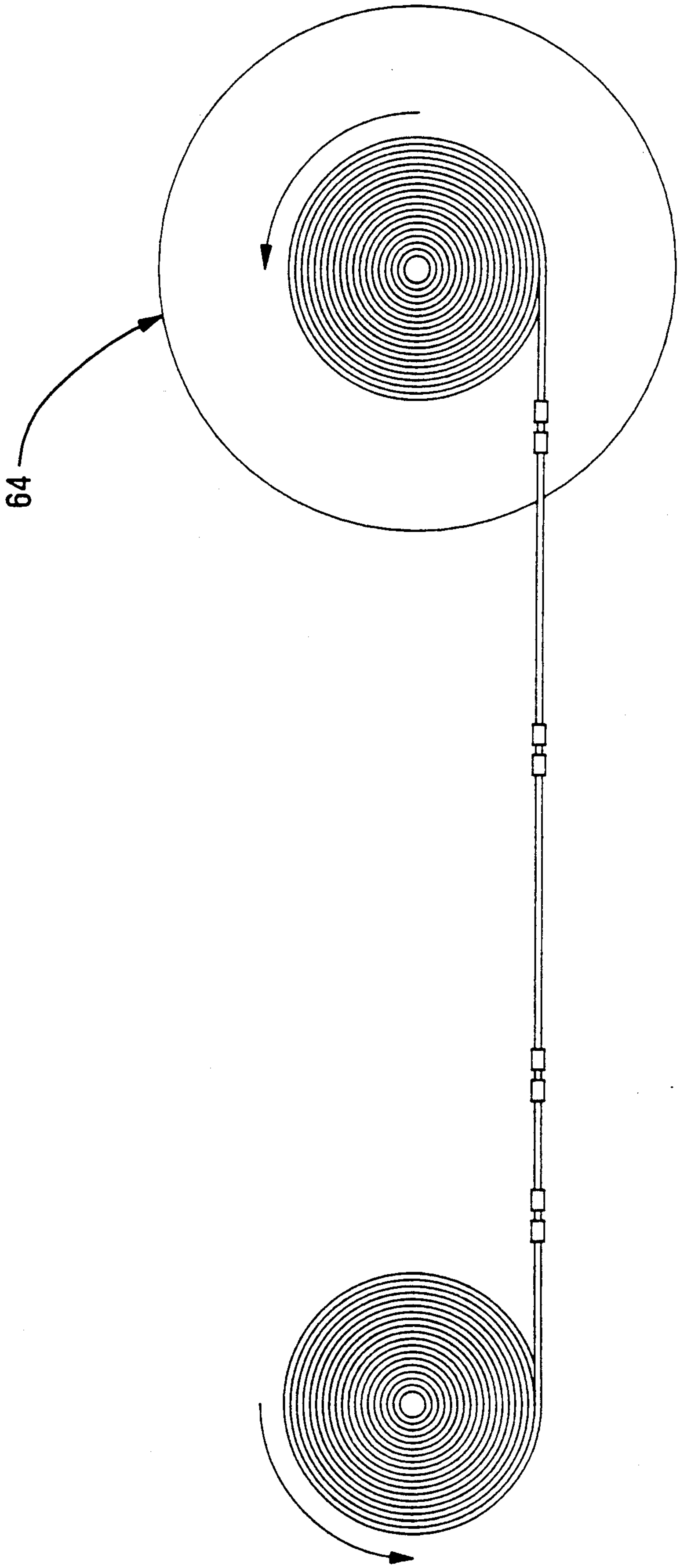
FIG. 12 is a view which illustrates the manner in which coaxial cable having ferrules in accordance with the invention thereon can be reeled and stored for future use.

At this point the end of the cable 10 may be striped as shown in FIG. 4 and terminated in the usual manner to a connector or transducer. If desired, the cable 10 with the ferrules in place may be wound onto a reel 64, as shown in FIG. 12, for subsequent processing.

As will be appreciated by those skilled in the art, the present apparatus and method eliminates the tedious manual operations that must be performed under a microscope. This greatly reduces manufacturing costs and increases yield of the final product. Additionally, utilizing the teachings of the present invention, the entire process of cutting a fine coaxial cable to length and terminating both the shield and signal conductor of each end to a desired connector or transducer can be automated for further cost savings. A further advantage is that the ferrule 30 provides a clean, trim termination of the fine wire braid or helical shield 18 without loose ends of the fine wire projecting outwardly as with the prior art termination shown in FIG. 3.

I claim:

1. A terminal for the shield of a coaxial cable which comprises an inner conductor, an inner dielectric layer surrounding the inner conductor, a metallic shield surrounding the inner dielectric layer, and an outer dielectric covering over the metallic shield, the termination comprising:

(a) a ferrule surrounding the outer dielectric covering of a coaxial cable the ferrule having a portion projecting inwardly from an inner surface of a wall of said ferrule through said outer dielectric covering;
(b) said portion of said ferrule having a tip in mechanical contact with the metallic shield of the coaxial cable;
(c) an opening through said wall adjacent said tip; and
(d) an electrically conductive material in said opening in low-resistance contact with both said tip and a portion of said metallic shield adjacent said tip.

2. The termination according to claim 1 wherein said portion of said ferrule comprises a plurality of lances, each having a said tip in mechanical contact with said metallic shield and each having an opening through said wall adjacent thereto, and wherein said conductive material is in each said opening.

3. The termination according to claim 2 wherein said outer dielectric covering includes a plurality of openings in substantial alignment with said openings adjacent said tips, and said conductive material extends through both said openings.

4. The termination according to claim 3 wherein said conductive material is solder.

5. A method of terminating the metallic shield of a coaxial cable comprising:

(a) providing a strip of conductive material;
(b) forming a portion thereof projecting from a surface of said strip, said portion having a tip remote from said surface, an opening through said strip adjacent said portion of said strip;
(c) forming said strip into a ferrule about a coaxial cable and clenching in place so that said tip projects inwardly and into mechanical contact with the metallic shield of the coaxial cable; and
(d) depositing an electrically conductive material within said opening in low-resistance contact with both said tip and a portion of said metallic shield adjacent said tip.

6. The method according to claim 5 wherein said coaxial cable includes an outer dielectric covering over said metallic shield and where said clenching of step (c) includes causing said tip to penetrate through said dielectric covering.

7. The method according to claim 6 wherein said forming a portion in step (b) includes forming a plurality of lances each having a said tip and an opening through said strip adjacent each said lance, and wherein said depositing of step (d) includes depositing said conductive material in each said opening.

8. The method according to claim 7 wherein after step (c) and prior to step (d) performing the following step:

(c1) forming a first plurality of openings through said outer dielectric covering in substantial alignment with said openings adjacent said tips.

9. The method according to claim 8 wherein said forming of step (c1) includes directing a laser beam of light through said first plurality of openings to disintegrate portions of said outer covering, thereby forming a second plurality of openings.

10. The method according to claim 5 wherein said depositing of step (d) includes depositing solder paste in said second plurality of openings and heating said solder paste, ferrule, and shield to effect said low-resistance contact.

* * * * *